(12) United States Patent
Don (10) Patent No.: US 7,522,827 B2
(45) Date of Patent: Apr. 21, 2009

(54) PROJECTION SYSTEM AND COOLING SYSTEM OF THE SAME

(75) Inventor: An Yong Don, Suwon-Si (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 11/302,461

(22) Filed: Dec. 14, 2005

(65) Prior Publication Data

US 2007/0030459 A1 Feb. 8, 2007

(30) Foreign Application Priority Data

Aug. 5, 2005 (KR) .................. 10-2005-0071769

(51) Int. Cl.
G03B 17/00 (2006.01)
G03B 15/02 (2006.01)
G03B 7/099 (2006.01)
G03B 13/00 (2006.01)
G02B 7/28 (2006.01)

(52) U.S. Cl. .................. 396/60; 396/61; 396/77; 396/119

(58) Field of Classification Search .......... 353/52, 353/54, 57, 58, 60, 61, 77, 119; 359/820; 349/9

See application file for complete search history.

(56) References Cited

U.S. PATENT DOCUMENTS

| 6,814,446 B2* | 11/2004 | Yamada et al. ............. 353/60 |
| 6,844,993 B2* | 1/2005 | Fujimori et al. ........... 359/820 |
| 7,083,286 B2* | 8/2006 | Kim et al. .................. 353/61 |
| 2003/0189694 A1* | 10/2003 | Yamada et al. ............ 353/77 |
| 2003/0189695 A1* | 10/2003 | Arai et al. ................. 353/77 |
| 2004/0218356 A1 | 11/2004 | Seki et al. ................. 361/690 |
| 2007/0030458 A1* | 2/2007 | Kim ........................... 353/58 |
| 2007/0030461 A1* | 2/2007 | Lee ............................ 353/119 |

FOREIGN PATENT DOCUMENTS

| CN | 1444091 | 9/2003 |
| CN | 1444092 | 9/2003 |
| CN | 1580942 | 2/2005 |
| EP | 1 124 156 B1 | 10/2005 |

OTHER PUBLICATIONS

Chinese Office Action dated Jul. 25, 2008 (and English-language translation).
Chinese Office Action dated Aug. 15, 2008 (and English-language translation).

* cited by examiner

Primary Examiner—Melissa J Koval
(74) Attorney, Agent, or Firm—KED & Associates, LLP (57) ABSTRACT

A projection system may include a lamp irradiating a light, an illumination unit providing a plurality of lenses on light paths, a composition unit providing an image by separating/composing the light, a projecting lens projecting the light composed in the composition unit to a screen, a cool air injection guide provided to one side of the composition unit for guiding an air injection port to be injected into the composition unit, and an injection port guide interposed on a contact portion of the cool air injection guide and the composition unit. The injection port guide may be formed in plate-shape. An injection port may be formed on the injection port guide to eject the air to the composition unit. A fan may be formed on other side of the composition unit for transmitting a negative pressure to the side of the composition unit.

18 Claims, 9 Drawing Sheets

PROJECTION SYSTEM AND COOLING SYSTEM OF THE SAME

BACKGROUND OF THE INVENTION

Field of the Invention

The present invention relates to a projection system, and more particularly, to a cooling system for the projection system to smoothly perform a cooling of a reflective liquid crystal display wherein a LCOS panel forms an image. More specifically, it relates to a cooling system of a projection system to smoothly perform a cooling of an optical engine unit generating a high heat in a projection system, in particular a composition unit.

BACKGROUND OF THE INVENTION

The liquid crystal on silicon (hereinafter, referred to as "LCOS"), a sort of reflective liquid crystal display, which forms a liquid crystal cell on a semiconductor substrate differently from a typical crystal liquid display, realizes a large screen in a high resolution having more than XGA grade in a small size in the order of 1 inch by arranging the elements of each pixel and a switching circuit in a high integration.

For such reasons, the LCOS panel has come into the spotlight as a display device of the projection system, and the technical development and commercialization of the LCOS panel and the projection display system using the same are actively in progress.

As methods to implement a full-color screen, the projection system has used a 3-panel method converting a white light into R (Red), G (Green) and B (Blue) lights, composing R, G and B lights implemented by three LCOS panels each corresponding to R, G and B lights as color images and projecting the images to a screen.

Such a general LCOS projection system comprises an illumination unit projecting the light, a composition unit composing each R, G and B image, imaged on the LCOS panel after the light is projected, as images, a projecting lens projecting the light composed in the composition unit, and a screen on which the light projected from the projecting lens is imaged. In particular, although the illumination unit, the composition unit and the projecting lens are commonly named as an optical engine, the optical engine is the part on which a high heat is generated by the illuminating light and if the high heat is not cooled, it causes the degradation of image quality.

Under such a background, a proper cooling system should be equipped so that the high heat is cooled. If the high heat is not cooled, it may cause problems that a plurality of films included in the illumination unit and the LCOS panels included in the composition unit are oxidized and further, the projection system is not normally operated.

However, during cooling by air injected for cooling operation, for the parts on which the image is formed, for example, the LCOS panel, it is important that the image is not deteriorated by foreign substance injected together with air. In detail, in case that the foreign substance are floated by a turbulent flow generated by the air injected for cooling or the foreign substance are injected together with air, it is apprehended that the foreign substance may contaminate a plurality of panels through which the light passes. Therefore, countermeasures thereof are required.

SUMMARY OF THE INVENTION

The present invention is provided to solve the above problems. It is an object of the present invention to provide a projection system and a cooling system for the same wherein the high heat generated in the projection system is rapidly cooled so that the projection system can be stably operated.

Also, it is an object of the present invention to provide a projection system and a cooling system for the same wherein the panels on which the image is imaged are prevented from being contaminated by the air injected for cooling the projection system.

Also, it is an object of the present invention to provide a projection system and a cooling system for the same wherein, although the projection system is used for many hours, the operation of the device can be stably performed.

Also, it is an object of the present invention to provide a projection system and a cooling system for the same wherein the operation reliability of the projection system is more further improved by making the cooling adaptively performed as to the components with higher temperature and lower temperature among the respective components forming the composition unit.

In order to accomplish the above object, a projection system according to the present invention comprises a lamp irradiating a light, an illumination unit providing a plurality of lenses on the light paths, a composition unit providing an image by separating/composing the light, a projecting lens projecting the light composed in the composition unit to a screen, a cool air injection guide provided to one side of the composition unit for guiding an air injection port to be injected into the composition unit, an injection port guide interposed on a contact portion of the cool air injection guide and the composition unit, wherein the injection port is opened in the closed condition on the whole, and a fan formed on other side of the composition unit for transmitting a negative pressure to the side of the composition unit.

The cooling system of the projection system according to other aspect of the present invention comprises a composition unit separating and composing light, an injection port guide covering one side of the composition unit with one side thereof, one or more injection port provided to the injection port guide, and a fan transmitting a negative pressure to allow a cool air to be injected into the side of the composition unit through the injection port.

The cooling system of the projection system according to another aspect of the present invention comprises a composition unit composing images, an injection port guide entirely covering one side of the composition unit, an injection port provided to the injection port guide for providing the path through which the air is passing, and a fan transmitting pressure to allow air to be injected into the side of the composition unit through the injection port.

As proposed above, since the cooling for every component of the projection system can be performed in an optimal condition by the present invention, the present invention can obtain the advantage that the reliability on the operation of device is improved. Moreover, since the amount of air to be injected into the composition unit is significantly reduced, the present invention can obtain the advantage that the composition unit is prevented from being contaminated by the foreign substance.

BRIEF DESCRIPTION OF THE DRAWINGS

The present invention will be described in detail with reference to the following drawings in which like numerals refer to like elements.

DETAILED DESCRIPTION OF THE INVENTION

The projection system and the LCOS panel assembly thereof according to the spirit of the present invention will be described in detail with reference to the drawings.

Figure 1:
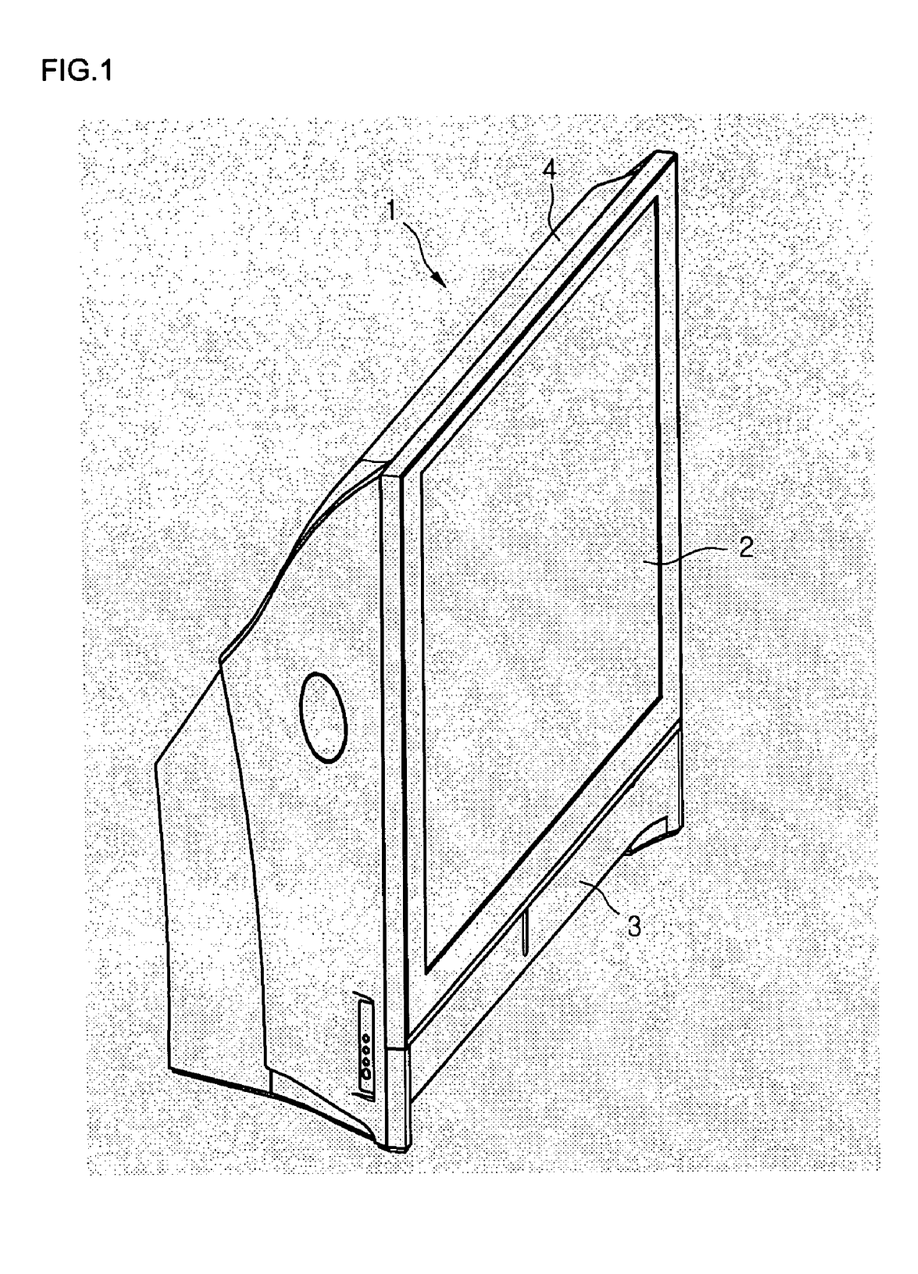
FIG. 1 shows a perspective view of a projection system according to the present invention.
Figure 2:
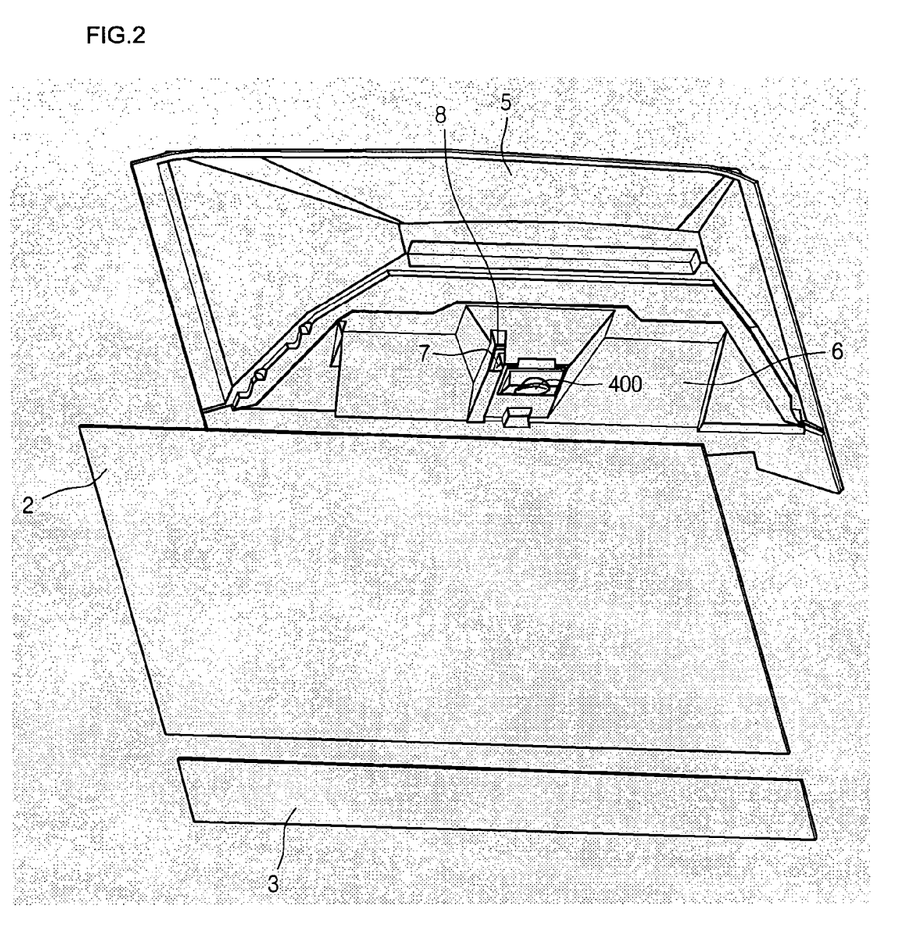
FIG. 2 shows an exploded perspective view of a projection system display according to the present invention.

FIG. 1 shows a perspective view of a projection system according to the present invention and FIG. 2 shows an exploded perspective view of a projection system display according to the present invention.

Referring to FIGS. 1 and 2, a projection system 1 according to the present invention comprises a screen 2, a front panel 3 disposed on the lower face of the screen 2, a back cover 4 disposed rear the screen.

Also, a separating plate 6 separating a light projecting space and an optical engine receiving space (see 10 in FIG. 3) is provided to the space between the screen 2 and the back cover 4. And, a reflective mirror 5 is seated inside the back cover 4, and the light projected from the optical engine 10 is reflected to the screen 2 and imaged as an image.

Also, on the side of separating plate 6 is formed with an opening 8, which mutually communicates the light projecting space with the optical engine receiving space, and the opening 8 on the side of the separating plate side is aligned with an air injection port 7, which is a path flowing air into the optical engine 10, in order to allow the inner air of the light projecting space to be injected into the optical engine 10. The air to be injected through the air injection port 7 is used as air for cooling the optical engine 10.

The reference numeral 400, which is not explained in FIG. 2, is a projecting lens emitting the light from the optical engine 10. The light emitted from the projecting lens 400 is reflected from the reflective mirror 5 after being emitted toward it, thereby forming an image on the screen 2.

Figure 3:
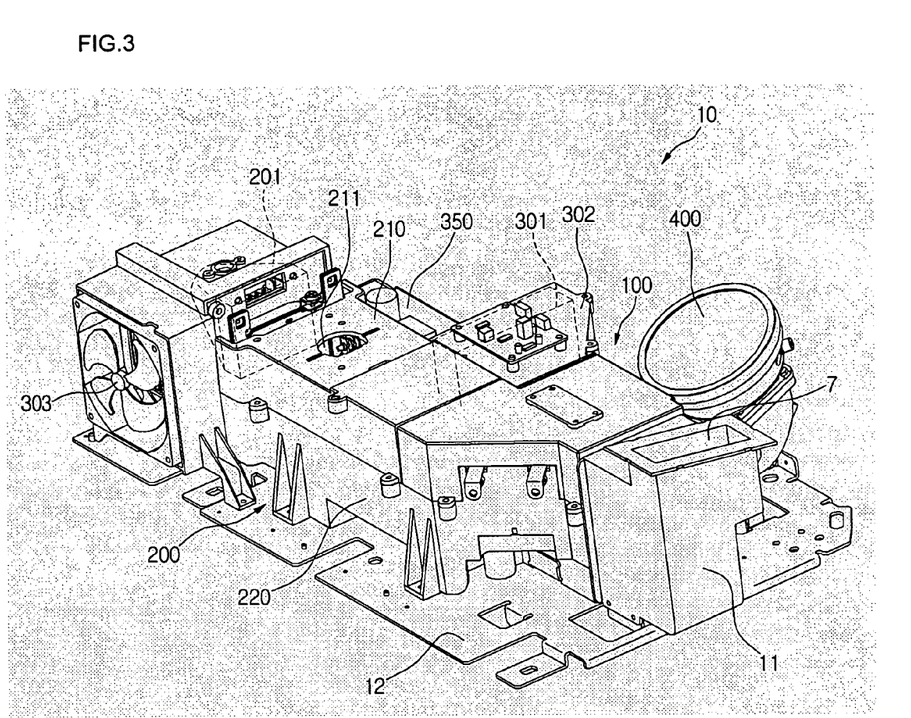
FIG. 3 shows a perspective view of an optical engine of the projection system according to the present invention.
Figure 4:
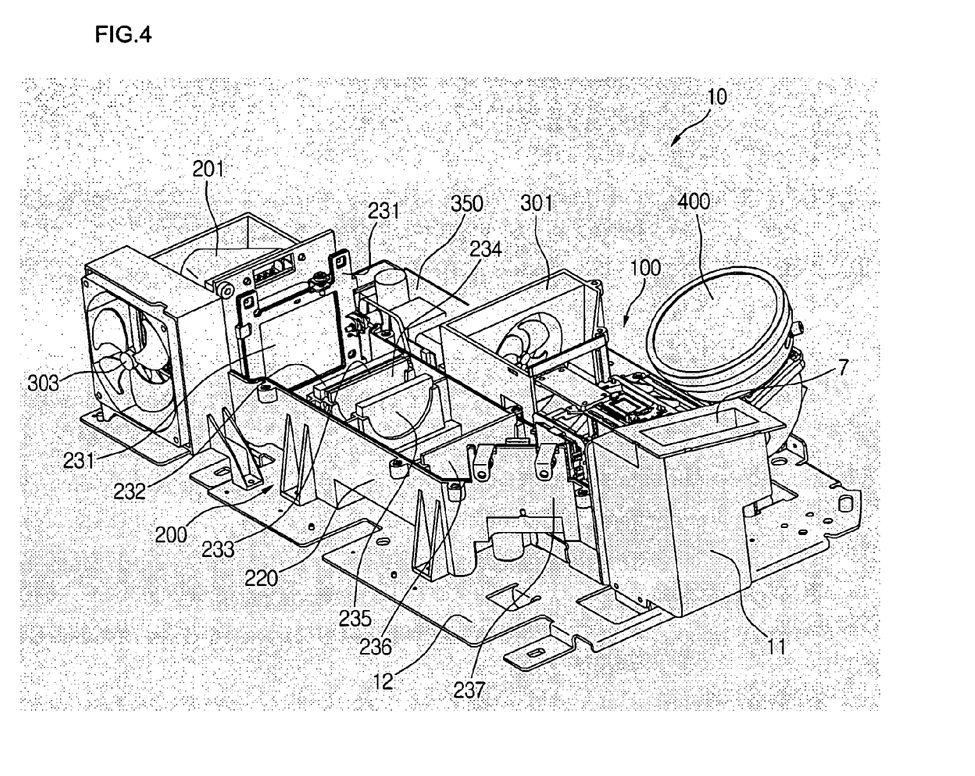
FIG. 4 shows a perspective view of the optical engine, wherein the cover of the optical engine is illustrated as being removed.

FIG. 3 shows a perspective view of an optical engine of the projection system of the present invention and FIG. 4 shows a perspective view of the optical engine, wherein the cover of the optical engine is illustrated as being removed. The constitution and the effects of the optical engine will be described in detail with reference to FIGS. 3 and 4.

The optical engine 10 comprises an engine base 12 forming a lower face of the optical engine 10, and a plurality of components disposed on the upper face of the engine base 12. In detail, it comprises an illumination unit 200 irradiating and refracting light, a composition unit 100 composing the image of three colors of R, G and B including image signals by the light illuminated by the illumination unit 200, and a projecting lens 400 emitting the light composed in the composition unit 100.

Also, it further comprises a power supplier 350 to stably supply the power, although it is not directly related to the formation of the image, and a fan 301,303 cooling heat generated from the optical engine 10. The power supplier 350 is formed with at least an electronic ballast to stably supply power to a lamp 201, and the fan 301,303 forcibly flow air for the operation of cooling system.

Each part of the constitution will be described in detail by each part.

First, the illumination unit 200 comprises a lamp 201 operated as a light source, a first FEL (Fly Eye Lens) 231 and second FEL 232 improving a uniformity of the illuminating light emitted from the lamp 201, a PBS (Polarizing Beam Splitter) 233 disposed behind the second FEL 232, a plurality of lenses 234,235,236 exactly projecting the light passing through each cell of FELs 231,232 to the fixed position of the LCOS panel, and a folding mirror 237 folding a progress direction of light to make it go toward the composition unit 100.

In detail, the PBS 233 uses a plurality of half-wave plates as a device to convert all the lights including the P-polarized light of the illuminating light into S-polarized light, and the FELs 231 and 232 makes light to be incident to the fixed position of such a PBS 233. Although the illuminating light comprises the P-polarized light of Y-axis wavelength and the S-polarized light of X-axis wavelength in the progress direction and vertical direction of the light, the P-polarized light being incident to the composition unit 100 is converted into the S-polarized light by the PBS 233 so that all the lights are incident into the composition unit in the form of the S-polarized light. Therefore, as the removable P-polarized light can be used again, it can obtain the advantage that use efficiency of light is improved In detail, the folding mirror 237 is a device making light to be incident toward the composition unit 100 by folding the progress direction of the illuminating light at an angle of 90 degrees. It is preferable to provide a predetermined device controlling the slope angle in the directions of right and left/up and down/front and rear, so that the progress direction can be exactly controlled.

Also, each component of the illumination unit 200 is seated on the illumination unit housing 220 fixed to the engine base 12. Each component is disposed inside the illumination unit housing 200 and then covered with a cover 210, whereby the components are protected from outer impacts and the injection of foreign substance into the inside of the illumination unit 200 is prevented. And, a penetrating opening 211 is formed on a predetermined position of the cover 210, and the penetrating opening 211 allows heat generated from each component constituting the illumination unit 200 and the inside space of the illumination unit 200 to be exhausted outward by a natural convection phenomenon. Although one penetrating opening 211 is shown in the drawings, a plurality of penetrating openings may be formed as needed. Preferably, the penetrating opening 211 is formed at least around the upper part of the PBS 233, whereby the high heat generated from the PBS 233 rises by a natural convection phenomenon to be exhausted outward.

The S-polarized light is separated by every wavelength form after being incident to the composition unit and is incident to the respective LCOS panels, and it is emitted through the projecting lens 400 after being reflected on the LCOS panel and composed in the condition including image signals. The constitution of the composition unit 100 will be described in detail below.

The projection system according to the present invention, in particular, the respective components of the cooling system of the optical engine 10 will be briefly described.

First, the optical engine 10 is formed with two fans 301,303 for forcibly flowing air, and a plurality of guides for guiding the flow of air by means of the fans 301,303. The cooling system of the engine will be described based on the flow order of air.

First, a cool air to be received in the light projecting space is injected into the space between the screen 2 and the back cover 4, that is, the optical engine 10, specially, the side of the composition unit 100, through the air injection port 7. The air injected into the composition unit 100 is injected into the first fan 301 after cooling heat inside the composition unit 100. And, the air ejected from the first fan 301 is ejected to the power supplier 350 so that the heat generated from the power supplier 350 is cooled.

Also, in order to cool the lamp 201, the second fan 303 is disposed on the side of the lamp 201. The second fan 303 allows the peripheral air of the power supplier 350 (the air including air ejected from the first fan 301) to be exhausted from the rear of the projection system after being injected into the lamp 201, that is exhausted outward the projection system.

As can be appreciated from the structure, the first fan 301 and the second fan 303 are made of the structure that is seated at the position adjacent to the place where the heat source is disposed in order to provide absorption force so that a cool air passes through the heat source to absorb the heat generated therefrom and is then suctioned by the fans 301, 303 for exhausting.

Figure 5:
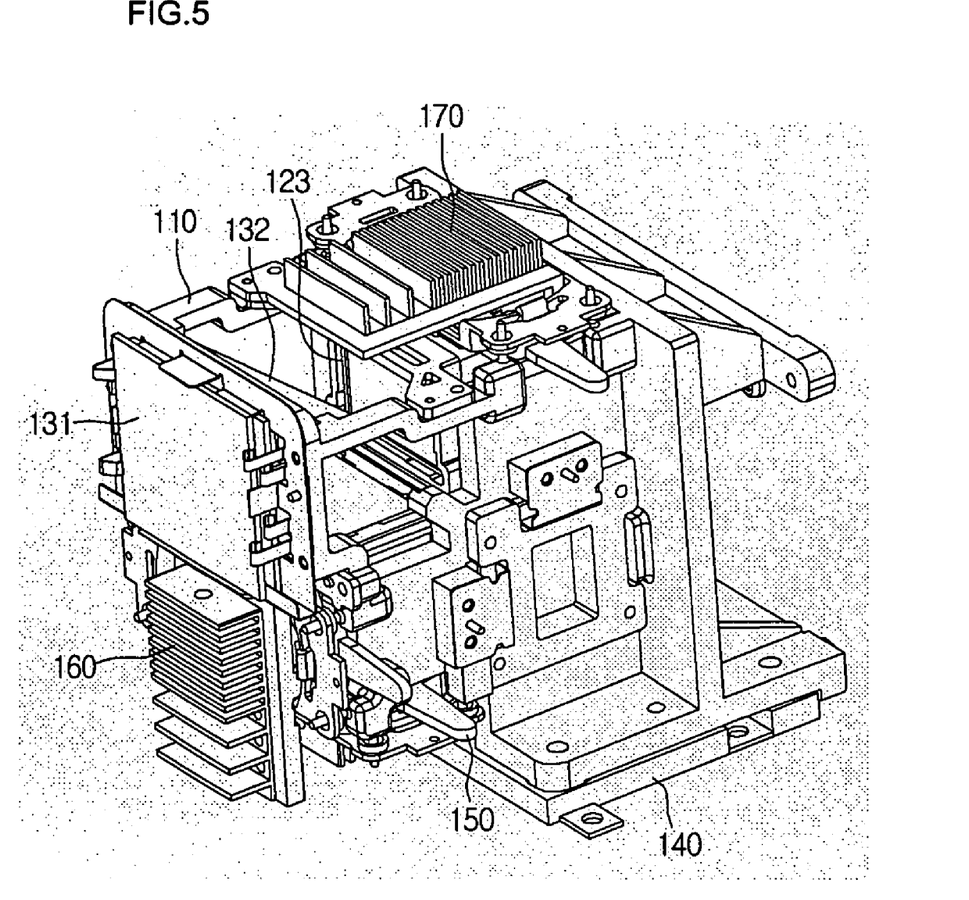
FIG. 5 shows a perspective view of a composition unit in the projection system according to the present invention.
Figure 6:
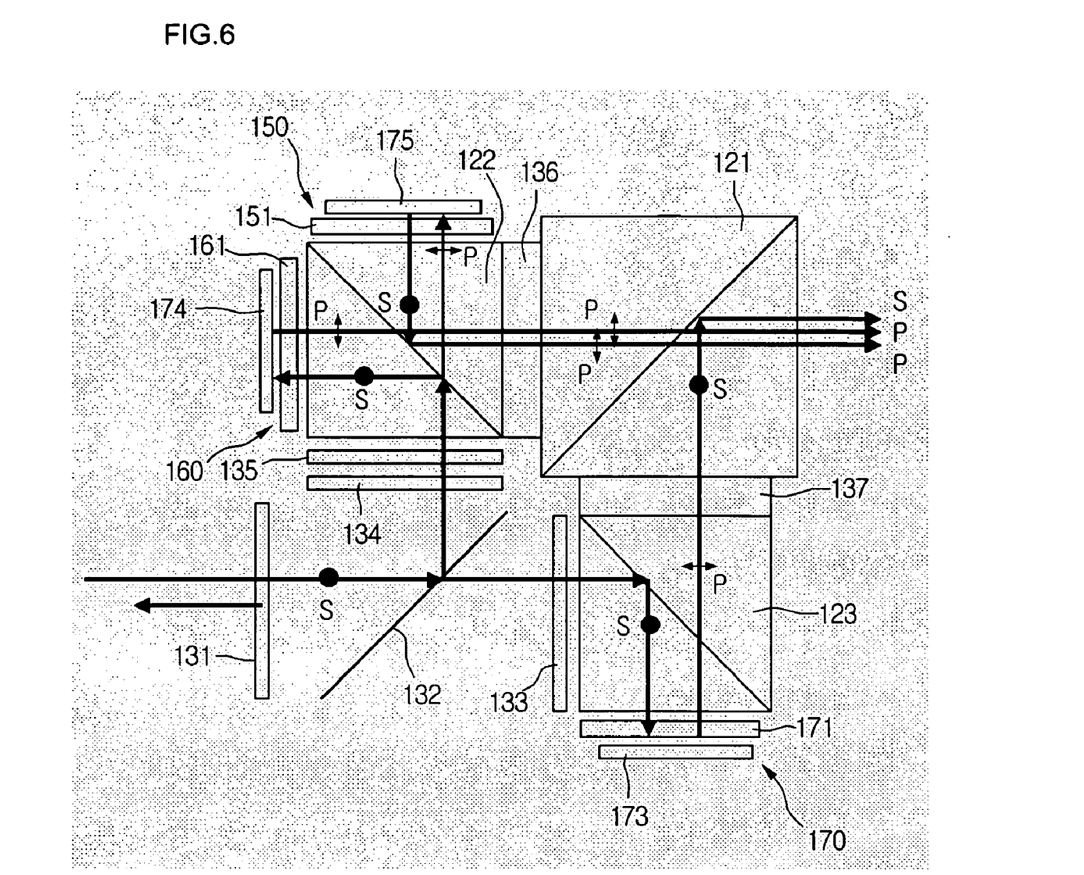
FIG. 6 shows the constitution and operation of the composition unit.

FIG. 5 shows a perspective view of a composition unit in the projection system according to the present invention and FIG. 6 shows the constitution and operation of the composition unit. The constitution and the operation associated with the composition unit 100 will be described in detail with reference to FIGS. 5 and 6.

Referring to FIG. 5, the composition unit 100 provides a plurality of quads and a LCOS panel assembly as a part forming an image by separating and composing the S-polarized light.

In detail, the composition unit 100 comprises three quads 121,122,123, a quad housing 110 supporting the quads, a single notch filter 131 filtering unnecessary yellow light from the S-polarized light, a dichroic mirror 132 transmitting blue color light and reflecting green color light and red color light, and three LCOS panel assemblies 150,160,170 fixed on the sides of quads 121,122,123 to form the images of three colors of red, green and blue, respectively. The LCOS panel assembly is made of the structure to be adjacent to the sides of the quads 121,122,123 in a predetermined position of the quad housing 110 and thus, it makes the light being incident from the quads to be incident to the exact position of the LCOS panel.

Needless to say, the composition unit 100 further includes a plurality of filters and a polarizing plate, etc. (not illustrated therein). The operation of the composition unit 100 will be described with reference to FIG. 6.

Referring to FIG. 6, after unnecessary yellow light among the S-polarized light being incident to the single notch filter 131 is reflected and filtered out, the S-polarized light are incident to the dichroic mirror 132 so that the green color light is transmitted and the red and the green color lights are reflected. The progress of the light will be described in detail below in order of the blue color light, the red color light and the green color light.

The S-polarized blue color light transmitting the dichroic mirror 132 first passes through the second reflective polarizing plate 133 so that the purity of the S-polarized light is improved. In other words, since the second reflective polarizing plate 133 transmits only the light in the same direction with the optical axis of the S-polarized blue color light and filters out lights having optical axis in different directions, the purity of the S-polarized light can be improved in the illumination light.

Thereafter, it is reflected on the third quad 123 and is then incident to the third LCOS panel. The quad as a beam splitter is operated to reflect the S-polarized light and to transmit the P-polarized light.

Thereafter, it is incident to the third quarter-wave plate 171 in which a line polarized light is changed to a circle polarized light and is then incident to the blue color LCOS panel 173 in which it is changed and reflected to the P-polarized blue color light in the condition including the blue color image. Although the P-polarized blue color light is incident again to the third quad 123, it transmits the third quad 123 as it is, since it is the P-polarized blue color light.

Thereafter, it is incident to the third birefringence polarizing plate 137 in which it is polarized by a half wavelength and changed to the S-polarized blue color light and is then incident to the first quad 121. The birefringence polarizing plate is a polarizing plate to sort out the polarized light, wherein this function is performed by the structure making the disposed state of the birefringence substance different, by every wavelength. Here, the third birefringence polarizing plate 137 is a birefringence polarizing plate to polarize the blue color light by a half wavelength.

Thereafter, since the S-polarized blue color light that is incident to the first quad 121 is the S-polarized light, it is reflected on the first quad 121 and is then incident to the projecting lens 400.

Also, after the S-polarized red color light reflected on the dichroic mirror 132 passes through the first reflective polarizing plate 134 so that the purity of the S-polarized light is improved, it is changed to the P-polarized red color light by passing through the first birefringence polarizing plate 135. The first birefringence polarizing plate 135 is a polarizing plate polarizing the red color light by a half wavelength using birefringence substance.

Thereafter, it is incident to the second quad 122. Since the incident light is the P-polarized red color light, it transmits the second quad 122 as it is and is then incident to the first LCOS panel assembly 150.

Thereafter, it is changed to a circle polarized light by means of the first quarter-wave plate 151 and is then incident to the red color LCOS panel 175 in which it is changed and reflected to S-polarized red color light in the condition including the red color image. As it is the S-polarized red color light, it is reflected on the second quad 122.

Thereafter, it is incident to the second birefringence polarizing plate 136 in which it is polarized by a half wavelength and changed to the red color light and is then incident to the first quad 121 in the changed condition. Since the P-polarized red color light that is incident to the first quad 121 is a P-polarized light, it transmits the first quad 121 and then, goes toward the projecting lens 400.

Also, after the S-polarized green color light reflected on the dichroic mirror 132 passes through the first reflective polarizing plate 134 so that the purity of the S-polarized light is improved, it transmits the first birefringence polarizing plate 135 as it is. Since the first birefringence polarizing plate 135 is a polarizing plate polarizing only the red color light by a half wavelength using birefringence substance, it cannot polarize the green color light.

Thereafter, it is incident to the second quad 122. Since the incident light is the S-polarized green color light, it is reflected on the second quad 122 and is then incident to the second LCOS panel assembly 150.

Thereafter, it is changed to a circle polarized light by means of the second quarter-wave plate 161 and is then incident to the green LCOS panel 175 in which it is changed and reflected to P-polarized red color light in the condition including the green color image. As it is the P-polarized red color light, it transmits the second quad 122 as it is.

Thereafter, since the P-polarized blue color light transmits the second birefringence polarizing plate 136, it is incident to the first quad 121 as it is, without being polarized. The second birefringence polarizing plate 136 changes only the red and blue color lights by a half wavelength but cannot polarize the green color light. Since the P-polarized red color light that is incident to the first quad 121 is P-polarized light, it transmits the first quad 121 and then, goes toward the projecting lens 400.

As described above, the red and the green color light are incident to the projecting lens in the P-polarized light condition, and the blue color light is incident to the projecting lens 400 in the S-polarized light condition. Thereafter, they are emitted from the projecting lens 400 and then, reflected on the reflective mirror 5, thereby being imaged as an image on the screen 2. At this time, as viewers view the image on the condition not to recognize whether the light of the image is the P-polarized light or the S-polarized light, there is not any influence in viewing.

As described above, the lights of three colors including images of red, green and blue color are composed and then, emitted through the projecting lens 400. If each light is not matched in the exact position, the image is distorted or the exact color is not implemented. Therefore, the matching process for each LCOS panel is further progressed.

Meanwhile, due to the light generated from the lamp 201, a high heat is generated from a plurality of components provided to the optical engine 10. Such a high heat needs to be rapidly exhausted outward for normal operation of device. If the high heat generated during the operation of device is not exhausted outward, it will bring about the problems that the matching of image may be distorted by means of the expansion of a component, and LCOS panel and various films are oxidized.

In order to solve the above problems, the present invention takes the method to perform a cooling by air suctioned into a fan. The cooling system of the projection system to solve the above problems will be described in detail below.

Figure 7:
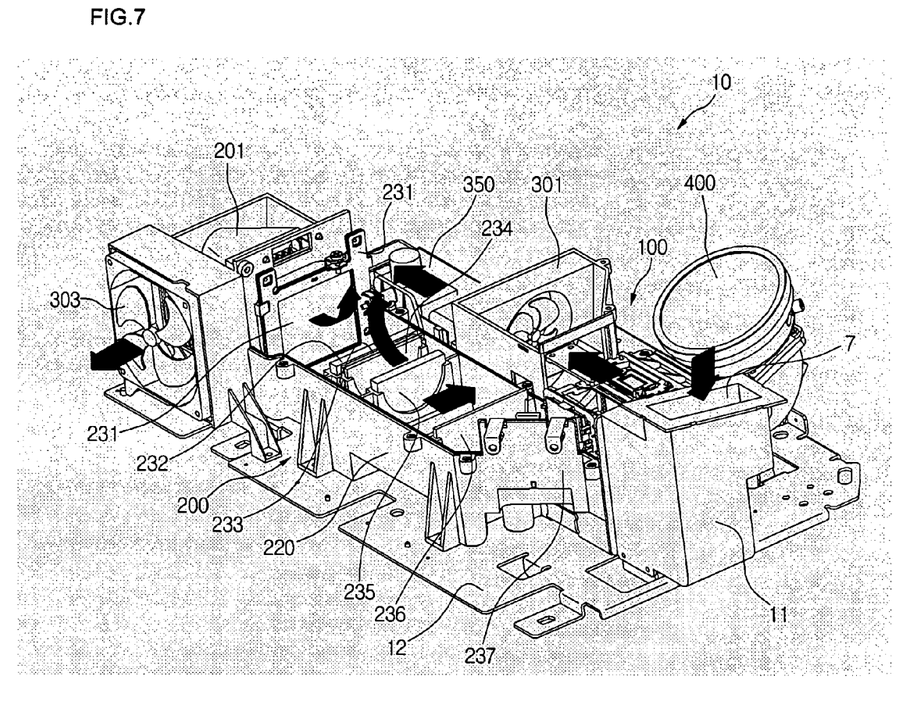
FIG. 7 shows a plan view of the optical engine according to the present invention.

FIG. 7 shows a plan view of the optical engine according to the present invention. The constitution and the operation associated with the cooling system of the projection system according to the present invention will be described in detail with reference to FIG. 7.

The cooling system of the present invention is divided into three parts: a first cooling system mainly cooling the composition unit 100, a second cooling system directly cooling the lamp 201 generating a high heat, and a third cooling system cooling components such as lens disposed inside the illumination unit by using a natural convection.

The first cooling system is a system operated by the first fan 301, wherein a cool air to be received in the space between the screen 2 and the back cover 4, that is, the light projecting space is injected into the composition unit 100 through the air injection port 7. The air injection port 7 is formed on the cool air injection guide 11 fixed to the sidewall of the composition unit, and is aligned with the opening 8 on the side of the separating plate. The inside of the cool air injection guide 11 is folded so that the progress direction of air injected from the upper side of the air injection port 7 folds toward the composition unit 100, that is, sideward the composition unit 100, thereby flowing the air into the composition unit 100. And, the air injected into the composition unit 100 cools the heat of the inside of the composition unit 100 and then, suctioned into the first fan 301.

Also, since the air injected into the composition unit 100 is injected only into particular positions by the injection port guide (see 190 in FIG. 8), it has effects that the injection amount of foreign substance injected into the composition unit can be reduced as well as efficient cooling can be performed for desired components.

Also, the outer sides of the first fan 301 are surrounded with a suction guide 302 so that the air injected into the inside of the composition unit 100 can be smoothly discharged. And, the air ejected from the first fan 301 is ejected to the power supplier 350, thereby cooling the heat generated from the power supplier 350.

As can be appreciated from the structure, the cooling system by means of the first fan 301 is made of the structure that the negative pressure delivered from the first fan 301 is to be delivered to the composition unit 100 and the cool air injection guide 11 so that the air in the light projecting space is suctioned through the opening 9 on the side of the separating plate.

Also, the negative pressure produced from the first fan 31 is delivered to the composition unit 100 as well as to the inside of the housing 220 of the illuminating unit. Therefore, the high heat inside the illuminating unit 200 can be injected and exhausted into and from the fan 301. To this end, it is preferable that the predetermined position on the sidewall of the housing 220 of the illuminating unit is formed with the predetermined size of holes.

The second cooling system according to the present invention is a system operated by the second fan 303 disposed on the side of the lamp 201. The second fan 303 allows the peripheral air (including air ejected from the first fan 301) of the power supplier 350, which flows into the lamp 201 and then, absorbs the high heat generated from the lamp 201, to be exhausted from the rear of the projection system, that is, outward the projection system.

As can be appreciated from the structure, the first and second cooling systems are made of the structure that is seated at the position adjacent to the place where the heat source is disposed in order to provide absorption force so that a cool air passes through the heat source to absorb the heat generated therefrom and is then suctioned by the fan 301, 303 for exhausting. When the air suctioned by the cooling system of such adsorption method flows into the high heat emitting parts, for example, the composition unit 100, it has an advantage that the cooling efficiency for the high heat emitting parts can be increased as the air stably flows in a flowing form of a laminar flow. Further, since the foreign substances are not floated due to the air injected into the high heat emitting parts, it has an advantage that their contamination by the foreign substance can be prevented.

The third cooling system according to the present invention is achieved with the penetrating opening 211 provided on the face of the cover 210. As a hot air at the inside of the illumination unit rises by convection phenomenon and is then exhausted outward the illumination unit through the penetrating opening 211, the third cooling system can be operated without a separate driving source. It has advantage that it is not difficult to cool the inside of the illumination unit 200 since the inside thereof is not so high temperature condition, even in case using the cooling system of a natural convection method, and the density of foreign substance in inner air of the optical engine 10 can be reduced and the contamination of the LCOS panel, etc., can be prevented, since the foreign substance are not floated.

It has advantages that the cooling efficiency for the projection system, in particular the optical engine can be improved as well as the contamination thereof can be reduced, by the cooling system proposed. Meanwhile, the contact portion of the cool air injection guide 11 and the composition unit 100 is further interposed with the injection port guide (see 190 in FIG. 8). By the injection port guide 190, it has also advantages that the cooling efficiency can be improved during the operation of the first cooling system and the amount of foreign substance injected into the inside of the composition unit can be reduced.

Figure 8:
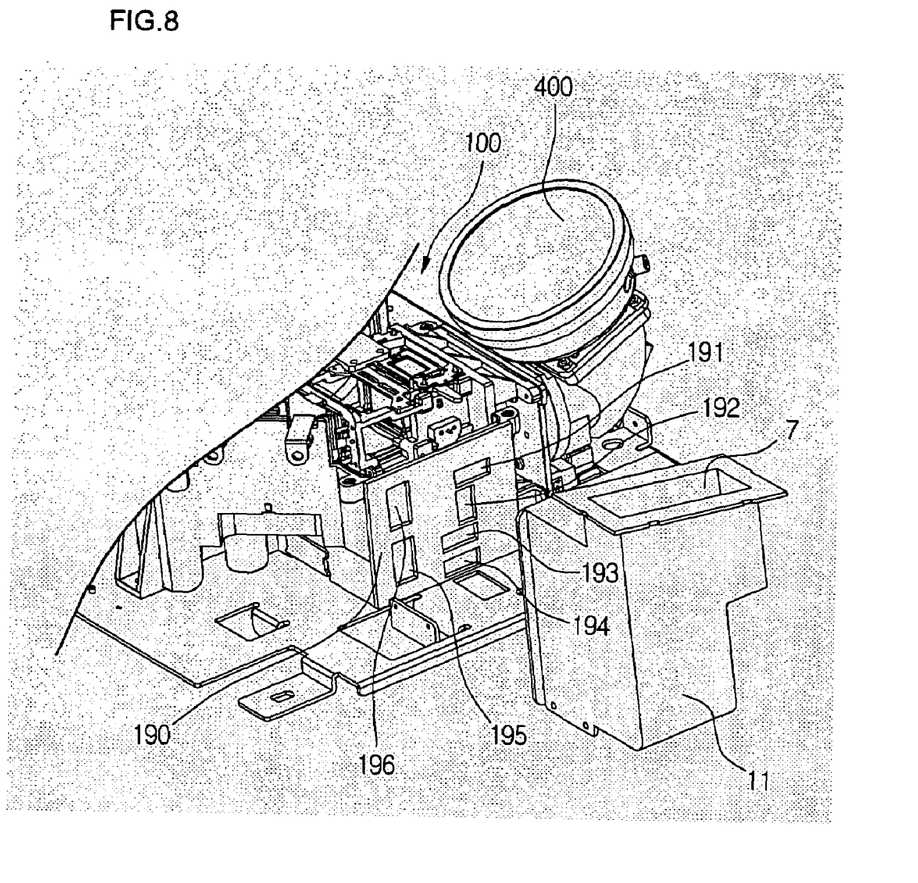
FIG. 8 shows an exploded perspective view of the right side of the composition unit according to the present invention.

The constitution and operation associated with the injection port guide 190 will be described below in detail.

Referring to FIG. 8, the right side of the composition unit 100 is disposed with the cool air injection guide 11 that is provided with the cool air injection port 7 and the contact portion of the cool air injection guide 11 and the composition unit 100 is interposed with the injection port guide 190, as described previously.

The injection port guide 190 is closed on the whole and is formed with the injection ports 191 to 196, which are able to flow air. As will be clearly appreciated by the structure of the injection port guide 190, the injection port guide 190 entirely does not pass air injected from the cool air injection guide 11, but the air is injected only through the injection ports 191 to 196. Therefore, if the negative pressures applied from the first fan 301 are identical, the flow velocity of air injected through the injection ports 191 to 196 becomes fast in comparison with case the injection port guide 190 is not provided and the amount of air injected through the injection ports 191 to 196 entirely becomes small in comparison with case the injection ports 191 to 196 are not provided. By the structure, the positions at which the injection ports 191 to 196 are provided correspond to the components generating more heat among the components of the composition unit 100 so that the heat generated from the composition unit 100 can be cooled more rapidly. Further, since the amount of air flowing into the inside of the composition unit 100 is reduced, the amount of foreign substance flowing into the inside of the composition unit 100 is also reduced, whereby it has advantages that the contamination of the components required for forming an image, such as the LCOS panel and the quarter-wave plate, etc., can be reduced.

Figure 9:
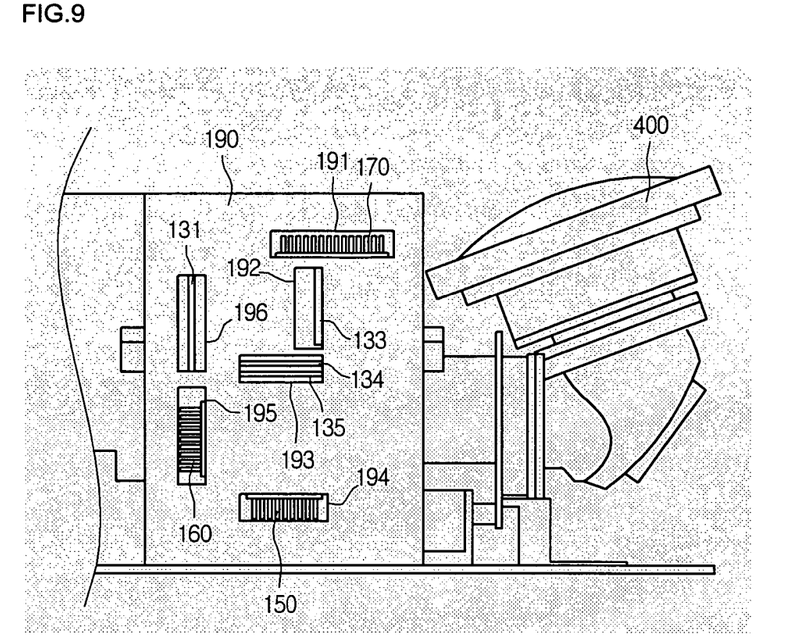
FIG. 9 shows the corresponding relation of the composition unit and the injection port guide in the cooling system according to the present invention.

FIG. 9 is a right view of the composition unit wherein the cool air injection guide is removed, as a view for explaining the corresponding relation of the composition unit and the injection port guide in the cooling system according to the present invention.

Referring to FIG. 9, as described previously, the injection port guide 190 is formed with a plurality of the injection ports 191 to 196 and the position at which the composition unit is aligned with the injection port guide 190 is disposed with a plurality of components generating relatively more heat. By the corresponding relation, it can obtain effects that cool heat efficiently and rapidly, without requiring for flowing a large amount of air into the inside of the composition unit 100.

Describing in detail the corresponding relation of the injection ports 191~196 and the composition unit 100, the third LCOS panel assembly 170 in which a blue color image is formed is first disposed immediately behind the first injection port 191, the second reflective polarizing plate 133 is disposed immediately behind the first injection port 192, the first reflective polarizing plate 134 and the first birefringence polarizing plate 135 are disposed immediately behind the third injection port 193, the first LCOS panel assembly 150 in which a red color image is formed is disposed immediately behind the fourth injection port 194, the second LCOS panel assembly 160 in which a green color image is formed is disposed immediately behind the fifth injection port 195, and the single notch filter 131 in which a yellow light is separated is disposed immediately behind the sixth injection port 196.

It can be appreciated that the corresponding relation as proposed allows the injection ports 191 to 196 to be formed at the corresponding positions immediately above the components of the composition unit heated at a high temperature or the components of the composition unit being weak against heat. Also, it can be expected that the sizes of the injection ports 191 to 196 change depending on the temperature of the high heat emitting parts. For example, if the temperature of the high heat emitting parts is high relatively, the size of the injection ports becomes large relatively in order to allow a large amount of air to be injected, and if the temperature of the high heat emitting parts is low relatively, the size of the injection port becomes small relatively in order to allow a small amount of air to be injected.

Table 1 indicates experiment results for flow amount in case the injection port guide 190 is provided and the injection port guide 190 is not provided.

TABLE 1

| | Nonexistence of injection port guide | Existence of injection port guide |
| --- | --- | --- |
| Flow amount (m^3/s) | 0.0044616 | 0.002517 |

Referring to the table 1, in case the injection port guide is provided, it can be appreciated that the flow amount flowing into the composition unit 100 is reduced. In case the flow amount is reduced, since the amount of foreign substance injected along with air is reduced, the possibility that a plurality of panels disposed on the light paths, such as the LCOS panel and the quarter-wave plate, etc., will be contaminated by the foreign substance is reduced, thereby achieving an improved image quality. Further, since the amount of foreign substance floating on the light paths is reduced, the image quality can be further improved.

Of course, if more injection port guides are provided, since the total amount of an injection air is reduced but the flow velocity of air in the position at which the injection port is provided becomes faster, it can be easily expected that the cooling efficiency for the components generating heat is not reduced but further improved in comparison with case the injection port guide is not provided. Also, it can be easily expected that the flow velocity passing through each of the injection ports changes depending on the shape and size of the injection port. As a result, appropriately using such conditions, it can be easily expected that the injection port with faster flow velocity is formed for the components with higher temperature and the injection port with slower flow velocity is formed for the components with lower temperature.

Figure 10:
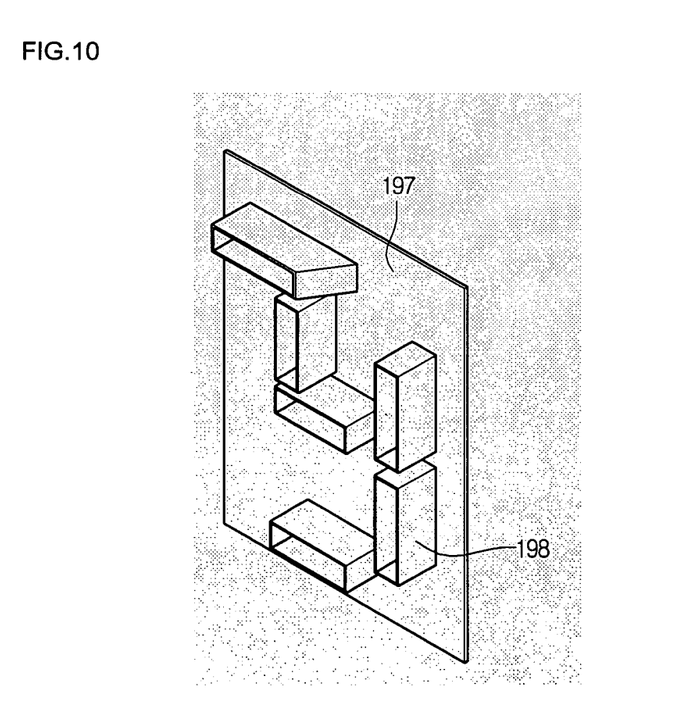
FIG. 10 shows a rear perspective view of the injection port guide according to another embodiment of the present invention.

However, if the injection port guide 190 is provided as above, it is apprehended that cooling efficiency may be reduced due to the increase of turbulent flow immediately behind the injection port. In order to prevent the degradation of cooling efficiency due to the generation of turbulent flow, the improved injection port guide 190 may be also proposed. Accordingly, the injection port guide 190 according to the other embodiment will be described below.

FIG. 10 is a rear perspective view of an injection port guide according to the other embodiment of the present invention.

Referring to FIG. 10, a plurality of the injection ports are provided to an injection port guide 197. This constitution is the same with one described above, except that a flow path guides 198, which are extended backward from the circumference of the rear of the injection port guide 197 facing the composition unit 100, are further provided to the injection port guide 197, unlike the injection port guide 190 of the embodiments described above.

The flow path guides 198 are further provided to the injection port guide 197, whereby it has an advantage that the air can be guided to be injected toward particular positions of the composition unit 100. Also, since the generation of turbulent flow is suppressed after the air is passed through the injection port, cooling efficiency for the cooled components is further improved.

Further, needless to say, it can obtain an advantage that a guide effect for the injected air is further improved in case the flow path guides 198 are provided in the sloped form, not the straight form, wherein this subject is also included in the scope of the present invention. Since the lengths of the flow path guides 198 are dependent on the relative position between the injection port guide 197 and the composition unit 100, the lengths of the entire flow path guides are not necessarily same and may be different depending on the relative positions between the high heat emitting parts.

Table 2 is one comparing the temperature of the high heat emitting parts with the entire flow volume by practicing an experiment depending on whether the flow path guide is or not, under the same conditions.

TABLE 2

|  | Position | Existence of flow path guide | Nonexistence of flow path guide |
|---|---|---|---|
| Temperature (° C.) | Third LCOS panel | 63.15 | 64.55 |
|  | Second LCOS panel | 60.49 | 60.77 |
|  | First LCOS panel | 59.52 | 59.58 |
|  | First reflective polarizing plate | 68.69 | 80.18 |
|  | Second reflective polarizing plate | 64.84 | 71.33 |
|  | First birefringence polarizing plate | 58.83 | 72.8 |
| Flow amount (m^3/s) | Entire | 0.002380 | 0.002517 |

Referring to the table 2, it can be appreciated that the temperature of the high heat emitting parts is reduced as compared case there is the flow path guide 198 with case there is not the flow path guide. Also, it can be appreciated that the flow amount of air injected through the injection port guide 197 is reduced, in case there is the flow path guide 198. Since the flow amount of air is reduced, it can be easily expected that the injection amount of foreign substance is also reduced. Of course, it will be expected that image quality is further improved, since the foreign substance floating inside the composition unit is reduced as the injection amount of foreign substance is reduced.

Further, it can be appreciated that the high heat emitting parts is mainly a filter, a polarizing plate, panel, etc., which are disposed in the path passing through light. As compared to a case that there is not the injection port guide 197, the foreign substance accumulated on the high heat emitting parts can be removed more easily by air injected at high speed. Therefore, in case the injection port guide 197 is provided, it will be expected that image quality is further improved by the composition unit.

For example, the fan may be formed in front of the injection port guide 190. In spite of making such a form, as the flow velocity of air passing through each injection port becomes different, it will be easily expected that it can perform adaptively the cooling for the high heat emitting parts. Further, only if the injection port guide 190 is provided to the suction side of the composition unit into which air is injected, the position at which the injection port guide 190 is disposed is not restricted.

The present invention has an advantage that since the high heat generated from the projection system, in particular the composition unit of the present invention is rapidly cooled, the projection system can be operated stably.

Further, the invention has an advantage that since the foreign substance attached to any components on paths transmitting light by air injected at high speed in order to cool the projection system can be removable smoothly, image quality is improved.

Also, the invention has an advantage that the operation reliability of the projection system is further improved by making the cooling adaptively performed as to the components with higher temperature and lower temperature among the respective components forming the composition unit.

In addition, the invention has advantages that since air is injected into the components transmitting light at high speed, the contamination thereof by foreign substance is reduced, and the amount of foreign substance along with air injected into the composition unit is reduced, image quality can be more further improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection system comprising:
   a lamp irradiating a light;
   an illumination unit providing a plurality of lenses on light paths;
   a composition unit providing an image by separating/composing the light;
   a projecting lens projecting the light composed in the composition unit to a screen;
   a cool air injection guide provided to one side of the composition unit to guide an injection path of air to be injected into the composition unit from a vertical direction to a horizontal direction;
   an injection port guide interposed on a contact portion between the cool air injection guide and the composition unit, wherein the injection port guide is formed in a plate-shape;
   at least one injection port formed on the injection port guide to allow the air to flow to the composition unit; and
   a fan formed on another side of the composition unit to transmit a negative pressure to the one side of the composition unit.

2. The projection system of claim 1, wherein a face of the injection port guide facing the composition unit is provided with a flow path guide guiding the flow of air passing through the injection port guide.

3. The projection system of claim 2, wherein the flow path guide includes at least one slope face.

4. The projection system of claim 1, wherein the at least one injection port is provided at a position where it is aligned with a high heat emitting part of the composition unit.

5. The projection system of claim 4, wherein the high heat emitting part includes at least one liquid crystal on silicon (LCOS) panel assembly.

6. The projection system of claim 4, wherein the high heat emitting part includes at least one birefringence polarizing plate.

7. The projection system of claim 4, wherein the high heat emitting part includes at least one reflective polarizing plate.

8. The projection system of claim 1, wherein the air passing through the composition unit flows horizontally.

9. The projection system of claim 1, wherein the air injected into the cool air injection guide in the vertical direction is inner air of a light projecting space.

10. The projection system of claim 1, wherein a plurality of the injection ports are provided.

11. The projection system of claim 1, wherein the injection port guide is formed in a singular plate-shape.

12. A cooling system of a projection system comprising:
a composition unit separating and composing light;
an injection port guide covering one side of the composition unit with one side thereof and formed in a singular plate-shape;
at least one injection port provided in the injection port guide and configured so air flows to the composition unit; and
a fan for transmitting a negative pressure to allow a cool air to be injected into the side of the composition unit side-through the at least one injection port.

13. The cooling system of claim 12, wherein the injection port guide is provided with a cool air injection guide for changing a direction of the flowing air, wherein the air is injected into the cool air injection guide in a vertical direction and is ejected from the cool air injection guide in a horizontal direction.

14. The cooling system of claim 12, wherein the at least one injection port is correspondingly aligned with at least one liquid crystal on silicon (LCOS) panel assembly and/or at least one birefringence polarizing plate and/or at least one reflective polarizing plate which are parts of the composition unit.

15. The cooling system of claim 12, further comprising a flow path guide extended from a circumference of the at least one injection port toward the composition unit.

16. The cooling system of claim 15, wherein the flow path guide is provided in a plate shape.

17. The cooling system of claim 15, wherein the flow path guide is sloped in a constant direction.

18. The cooling system of claim 11, wherein the fan is disposed opposing to one side of the composition unit on which the injection port guide is disposed.

* * * * *